(12) United States Patent
Schiffhauer et al.

(10) Patent No.: US 8,147,216 B2
(45) Date of Patent: Apr. 3, 2012

(54) MOTOR-PUMP UNIT

(75) Inventors: Walter Schiffhauer, Leutenbach (DE); Lanfranco Pol, Quistello Mn (IT)

(73) Assignee: Alfred Kaercher GmbH & Co., KG, Winnenden (DE)

( * ) Notice: Subject to any disclaimer, the term of this patent is extended or adjusted under 35 U.S.C. 154(b) by 169 days.

(21) Appl. No.: 12/583,085

(22) Filed: Aug. 12, 2009

(65) Prior Publication Data

US 2010/0047091 A1    Feb. 25, 2010

Related U.S. Application Data

(63) Continuation of application No. PCT/EP2008/000845, filed on Feb. 2, 2008.

(30) Foreign Application Priority Data

Feb. 21, 2007 (DE) .......................... 10 2007 009 394

(51) Int. Cl.
*F04B 39/06* (2006.01)
*H02K 9/00* (2006.01)

(52) U.S. Cl. .......................................... 417/371; 310/54

(58) Field of Classification Search ..................... 310/62, 310/63, 52, 54, 89; 417/371, 352, 366, 372, 417/423.1, 423.14, 410.3, 423.7; *H02K 9/19, H02K 9/193, 9/197*
See application file for complete search history.

(56) References Cited

U.S. PATENT DOCUMENTS

| | | | |
|---|---|---|---|
| 2,037,245 A | 4/1936 | Leifheit et al. | |
| 2,301,063 A * | 11/1942 | McConaghy | 417/370 |
| 2,734,459 A | 2/1956 | Zimsky | |
| 2,913,988 A | 11/1959 | White | |
| 2,914,253 A | 11/1959 | Jobus et al. | |
| 3,371,613 A * | 3/1968 | Dahlgren et al. | 417/368 |
| 3,426,691 A | 2/1969 | Anderson | |
| 3,525,001 A | 8/1970 | Erickson | |
| 3,744,935 A | 7/1973 | Magni | |
| 4,480,967 A | 11/1984 | Schulze | |
| 4,516,044 A * | 5/1985 | Bone | 310/64 |
| 4,844,701 A | 7/1989 | Wolford et al. | |

(Continued)

FOREIGN PATENT DOCUMENTS

DE    926 676    4/1955

(Continued)

*Primary Examiner* — Devon C Kramer
*Assistant Examiner* — Bryan Lettman
(74) *Attorney, Agent, or Firm* — Lipsitz & McAllister, LLC

(57) ABSTRACT

The invention relates to a motor-pump unit having an electric motor and a pump, the pump having a suction inlet and a pressure outlet, and the electric motor comprising a motor housing which is enclosed by a cooling housing, whereby a cavity is formed, it being possible for cooling liquid to be fed to the cavity via a cooling-housing inflow and to be conducted away therefrom via a cooling-housing outflow, and the cooling-housing outflow being in flow connection with the suction inlet. In order to develop the motor-pump unit such that, if required, a flow connection can easily be made from the cooling-housing inflow to the suction inlet via the cavity and the cooling-housing outflow, it is proposed that the motor-pump unit has a connecting device which is disposed laterally alongside the pump and has a first connection, which is connected in a releasable manner to the cooling-housing inflow via a first flow channel, and a second connection, which is connected in a releasable manner to the cooling-housing outflow via a second flow channel and is connected to the suction inlet.

18 Claims, 4 Drawing Sheets

U.S. PATENT DOCUMENTS

| | | | |
|---|---|---|---|
| 4,922,148 A | 5/1990 | Kitamura | |
| 5,113,103 A | 5/1992 | Blum et al. | |
| 5,174,730 A | 12/1992 | Nieuwkamp et al. | |
| 5,326,235 A | 7/1994 | Bruhn | |
| 5,354,182 A | 10/1994 | Niemiec et al. | |
| 5,388,970 A * | 2/1995 | Muckelmann et al. | 417/363 |
| 5,616,973 A * | 4/1997 | Khazanov et al. | 310/54 |
| 5,938,389 A | 8/1999 | Shore et al. | |
| 6,146,113 A | 11/2000 | Fassnacht et al. | |
| 7,005,765 B1 | 2/2006 | Schulz et al. | |
| 7,063,519 B2 * | 6/2006 | Agrawal et al. | 417/423.1 |
| 7,182,583 B2 * | 2/2007 | Gandrud et al. | 417/371 |
| 7,591,147 B2 * | 9/2009 | Masoudipour et al. | 62/505 |
| 2003/0031570 A1 * | 2/2003 | Kammhoff et al. | 417/368 |
| 2005/0175479 A1 | 8/2005 | Gandrud et al. | |

FOREIGN PATENT DOCUMENTS

| | | |
|---|---|---|
| DE | 27 16 184 | 10/1977 |
| DE | 29 20 883 | 12/1980 |
| DE | 81 11 792 | 8/1981 |
| DE | 30 17 117 | 11/1981 |
| DE | 37 17 641 | 11/1981 |
| DE | 35 45 665 | 7/1987 |
| DE | 85 36 175 | 7/1987 |
| DE | 36 03 423 | 8/1987 |
| DE | 37 38 592 | 5/1989 |
| DE | 38 17 641 | 11/1989 |
| DE | 41 05 349 | 8/1992 |
| DE | 94 17 662 | 2/1995 |
| DE | 196 52 706 | 6/1997 |
| DE | 197 16 758 | 10/1998 |
| DE | 102 47 310 | 4/2004 |
| DE | 103 05 812 | 9/2004 |
| DE | 103 07 813 | 9/2004 |
| DE | 10 2005 046 120 | 3/2007 |
| EP | 0 177 925 | 4/1986 |
| EP | 0 314 607 | 5/1989 |
| EP | 0 627 558 | 12/1994 |
| EP | 0 819 852 | 1/1998 |
| FR | 2 473 912 | 7/1981 |
| FR | 2 504 206 | 10/1982 |
| JP | 63257434 | 10/1988 |
| WO | 0223699 | 3/2002 |

* cited by examiner

MOTOR-PUMP UNIT

This application is a continuation of international application number PCT/EP2008/000845 filed on Feb. 2, 2008.

The present disclosure relates to the subject matter disclosed in international application number PCT/EP2008/000845 of Feb. 2, 2008 and German application number 10 2007 009 394.4 of Feb. 21, 2007, which are incorporated herein by reference in their entirety and for all purposes.

BACKGROUND OF THE INVENTION

The invention relates to a motor-pump unit, in particular for a high-pressure cleaning appliance, having an electric motor and a pump, the pump having a suction inlet for taking in liquid and a pressure outlet for discharging pressurized liquid, and the electric motor comprising a motor housing which is enclosed by a cooling housing, whereby a cavity is formed, it being possible for cooling liquid to be fed to the cavity via a cooling-housing inflow and to be conducted away therefrom via a cooling-housing outflow, and the cooling-housing outflow being in flow connection with the suction inlet.

Such motor-pump units are known from laid-open applications DE 35 45 665 A1 and DE 36 03 423 A1. They are used in particular in high-pressure cleaning appliances in which a liquid, preferably water, can be fed to a pumping chamber via the suction inlet, subjected to pressure and then discharged via the pressure outlet. The pump is driven by means of an electric motor. In order to cool the latter, a cooling liquid can be fed to the cavity between the motor housing and the cooling housing. In this context, DE 35 45 665 A1 proposes to cool the motor with water and to feed to the suction inlet the water which has been heated by the motor. This means that the pump can be used not just to subject liquid to pressure, but also to deliver the liquid through the cavity which encloses the motor housing. The motor-pump units which are known from DE 35 45 665 A1 and DE 36 03 423 A1 have a cup-like cooling housing with a cooling-housing inflow, which is disposed on the base of the cooling housing, and with a cooling-housing outflow, which projects radially from the cooling housing. In order to ensure a flow connection to the suction inlet from the cooling-housing inflow via the cavity and the cooling-housing outflow, it is therefore necessary to have costly connecting lines, for example hose lines, which require appropriate fittings to be fitted on the cooling-housing inflow and on the cooling-housing outflow.

It is an object of the present invention to develop a motor-pump unit of the type mentioned in the introduction such that, if required, a flow connection can easily be made from the cooling-housing inflow to the suction inlet via the cavity and the cooling-housing outflow.

SUMMARY OF THE INVENTION

This object is achieved according to the invention, in the case of a motor-pump unit of the generic type, in that the motor-pump unit has a connecting device which is disposed laterally alongside the pump and has a first connection, which is connected in a releasable manner to the cooling-housing inflow via a first flow channel, and a second connection, which is connected in a releasable manner to the cooling-housing outflow via a second flow channel and is connected to the suction inlet.

The motor-pump unit according to the invention makes use of a connecting device with the aid of which, if required, liquid which is to be subjected to pressure can easily be channeled, in the first instance, through the cavity enclosing the motor housing and then to the suction inlet. For this purpose, the connecting device has a first connection, to which a supply line can be connected for the supply of liquid. From the first connection, the liquid is fed to the cavity via the first flow channel and the cooling-housing inflow. Exiting from the cavity, the liquid can then be fed to a second connection of the connecting device via the cooling-housing outflow and an adjoining, second flow channel. The second connection may be connected to the suction inlet of the motor-pump unit, so that overall, starting from the first connection of the connecting device, a flow connection is made to the suction inlet of the pump through the cavity.

The connecting device used according to the invention is disposed laterally alongside the pump, so that the motor-pump unit, including the connecting device, may be of compact construction.

The connecting device can be connected in a releasable manner to the suction inlet and the cooling-housing inflow and outflow. This has the advantage that the electric motor can be cooled optionally by air or also by means of liquid. Air cooling can be considered if the electric motor does not have to provide particularly high output levels. The connecting device can then be separated from the suction inlet and from the cooling-housing inflow and outflow, and instead a conventional suction connector can be connected to the suction inlet, it being possible for the pressurized liquid to be fed to the pump via this suction connector.

If greater quantities of heat are to be dissipated from the electric motor, the connecting device can be connected to the suction inlet and the inflow and outflow of the cooling housing. There is no need for any further changes to be made to this motor-pump unit, and the provision of the two connections and of the two flow channels means that the operation of connecting the connecting device to the suction inlet and the inflow and outflow is very straightforward.

It is particularly advantageous if the connecting device is configured as a structural unit which is adapted to be connected in a releasable manner to the suction inlet and the cooling-housing inflow and outflow. This makes it easier for the connecting device to be fitted to the pump and to the cooling housing. The connecting device may be configured in the form of a connection module which can be used if required, namely when the electric motor develops a lot of heat.

The electric motor used may be, for example, a universal motor.

It is particularly advantageous if the electric motor is in the form of an asynchronous motor.

Particularly straightforward fitting of the connecting device is achieved, in the case of a preferred embodiment, in that the connecting device is configured as a rigid conduit system. The connecting device thus forms an inherently stable component which can easily be positioned laterally alongside the pump and connected to the suction inlet and the inflow and outflow of the cooling housing.

The connecting device is preferably produced from plastics material. This makes it possible not just to produce the connecting device cost-effectively, but also to reduce weight to a considerable extent.

The two flow channels of the connecting device are advantageously disposed parallel to one another. It is particularly advantageous if the two flow channels are disposed laterally alongside one another. Preferably, they are adapted to be connected by plug-in action to the cooling-housing inflow and the cooling-housing outflow. It may be provided, for example, that the free ends of the two flow channels are adapted to be plugged into corresponding bushings of the inflow and outflow.

The two flow channels may be configured, for example, in the form of rigid tubing lines.

In a particularly preferred configuration of the motor-pump unit according to the invention, the cooling housing is adapted to be connected in a releasable manner, for example screwed, to a housing of the pump. If there is no need for any liquid cooling, the cooling housing may be removed from the rest of the motor-pump unit. If use is to be made of liquid-cooling, the cooling housing can be screwed to the pump housing, in which case it encloses the motor housing with a cavity being formed in the process.

It is advantageous if the cooling housing is produced from plastics material, since it is thus possible to reduce the production costs and the weight of the motor-pump unit.

It is advantageous if the cooling-housing inflow and the cooling-housing outflow are disposed one beside the other, since this can simplify the fitting of the connecting device.

In a preferred embodiment, the cooling housing comprises a casing part, which encloses the motor housing, and a connection part, which projects outward from this casing part, the cooling-housing inflow and the cooling-housing outflow being disposed on the connection part.

In a preferred configuration of the invention, the connection part projects beyond the casing part in the direction of the pump, since this allows the flow connection between the cooling housing and the suction inlet of the pump to be kept particularly short.

It is advantageous if the casing part is connected integrally to the connection part; provision may be made, for example, for the casing part and connection part to be configured as a single-piece plastics molding.

The cooling housing preferably has a casing part which encloses the motor housing in the circumferential direction and comprises, on its inside, a plurality of spaced-apart, in particular axially running supporting ribs which engage against the motor housing. The cooling housing can be supported in a stable manner on the motor housing by means of the supporting ribs, a cavity through which the cooling liquid can be channeled being formed between the motor housing and the cooling housing. In such a configuration, the cooling housing encloses the motor housing in the circumferential direction. It may thus be formed in the manner of a tube portion. The motor-housing rear wall, which is directed away from the pump, may accommodate a bearing for the motor shaft, this wall not being covered by the cooling housing.

In the cavity, a supporting rib is preferably disposed between the cooling-housing inflow and the cooling-housing outflow. The supporting rib can ensure, in a constructionally straightforward manner, that the liquid fed to the cavity via the cooling-housing inflow has to flow around the motor housing in the circumferential direction before it can pass to the cooling-housing outflow, and this ensures effective dissipation of heat.

In a particularly preferred embodiment, the supporting ribs define a labyrinthine flow path which leads around the motor housing in the circumferential direction from the cooling-housing inflow to the cooling-housing outflow. For this purpose, it may be provided, for example, that the supporting ribs have a through-passage, axially offset in relation to one another in each case, through which the cooling liquid can flow. The axially offset arrangement of the through-passages ensures that the cooling liquid flows in meandering or zigzag form through the cavity which encloses the motor housing. It is thus possible to lengthen the flow path of the cooling liquid within the cavity and thus to increase the absorption of heat.

The cooling housing preferably comprises a casing part which is configured in the manner of a cylindrical sleeve and is adapted to be pushed axially onto the motor housing. This simplifies the operation of fitting the cooling housing to the motor housing because all that is required for fitting purposes is for the casing part to be pushed axially onto the motor housing.

It is advantageous if the cooling housing has a sealing lip which is adapted to be positioned in a liquid-tight manner against the motor housing. The sealing lip may be connected in a releasable manner to a wall of the cooling housing. As an alternative, it may be provided that the sealing lip is integrally formed on the wall of the cooling housing; in particular it may be provided that the wall of the cooling housing and the sealing lip are connected integrally to one another and are produced from the same material. As an alternative, it may also be provided that the motor housing has disposed on it a sealing lip, for example a sealing ring, against which the cooling housing can be positioned in a sealing manner. The sealing lip can be used to seal the cavity at a front and/or rear end region of the cooling housing. If the cooling housing comprises a cylindrical casing part with a front opening directed toward the pump and a rear opening directed away from the pump, then a sealing lip may be disposed adjacent, for example, to the rear opening.

In order to seal the cavity, preferably in a front end region directed toward the pump, it is advantageous if the motor housing has an outwardly projecting annular flange onto which the cooling housing can be pushed in a liquid-tight manner. The cooling housing can be elastically deformed by means of the annular flange, so that it engages in a liquid-tight manner against the annular flange and thus seals the cavity. It may also be provided that at least one sealing ring is disposed between the cooling housing and the motor housing in order to seal the cavity.

The following description of a preferred embodiment of the invention serves for more specific explanation in conjunction with the drawings.

DETAILED DESCRIPTION OF THE INVENTION

Figure 1:
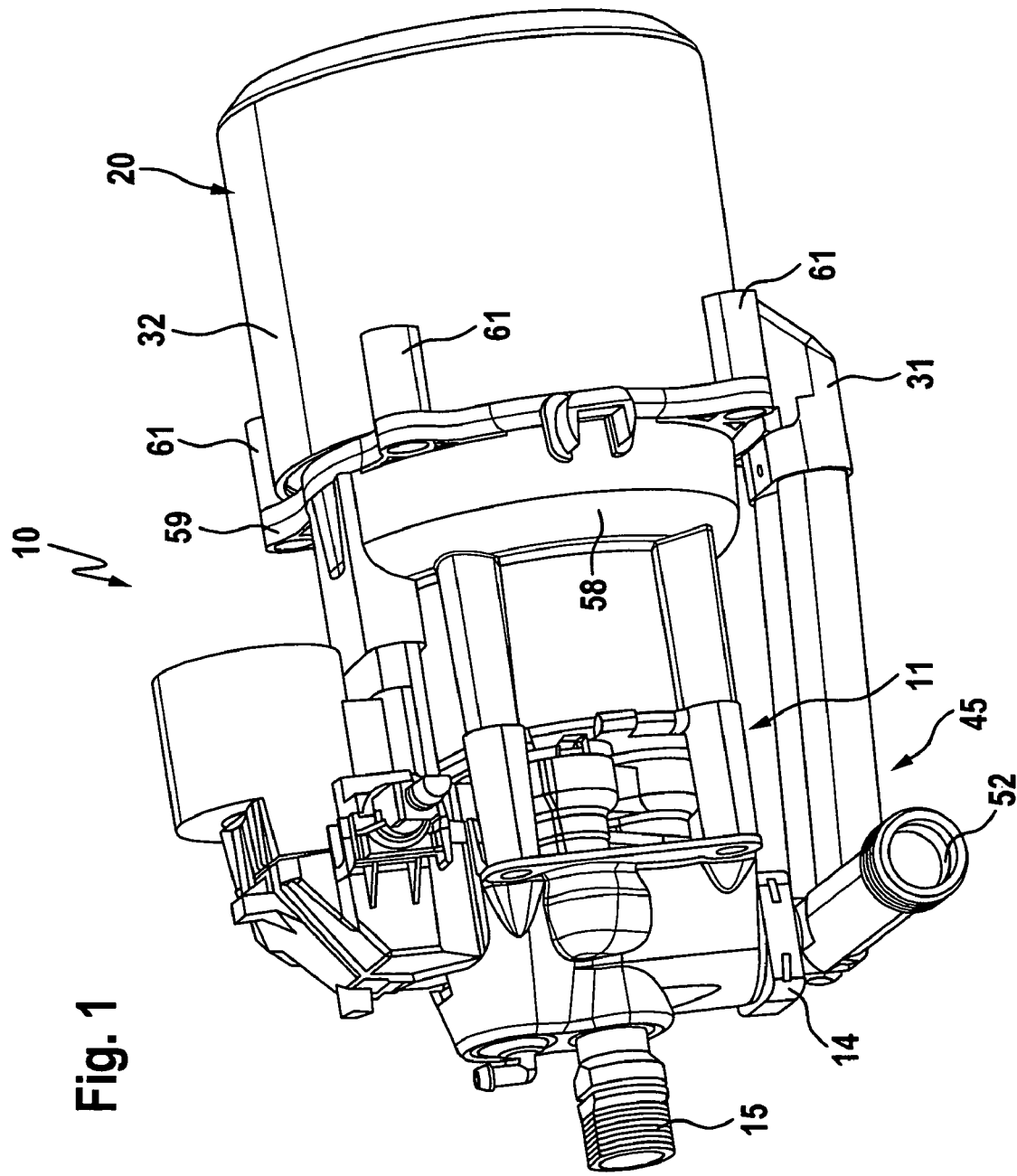
FIG. 1 shows a perspective illustration of a motor-pump unit according to the invention.
Figure 2:
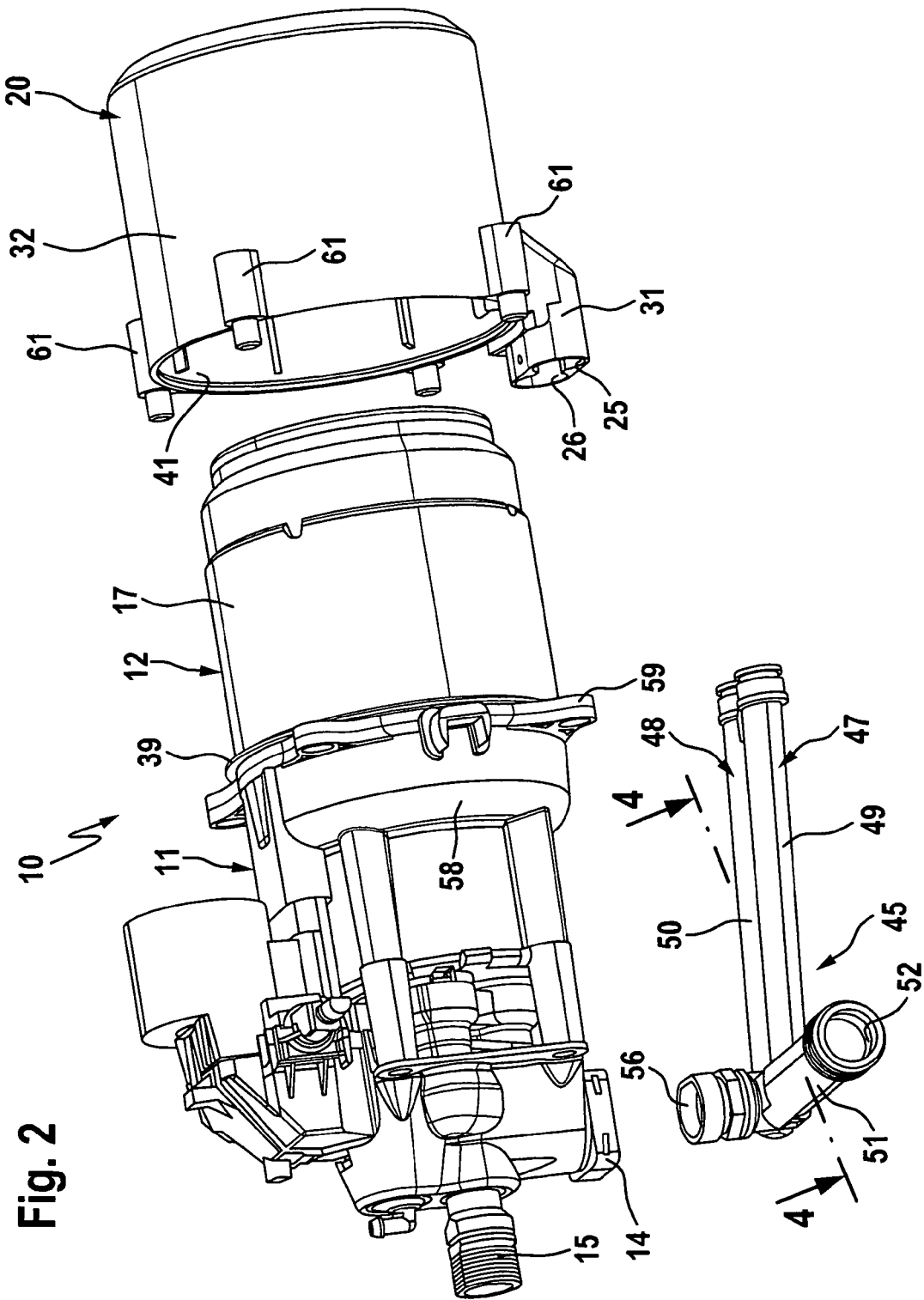
FIG. 2 shows a perspective illustration of the motor-pump unit from FIG. 1 in the form of an exploded drawing.
Figure 3:
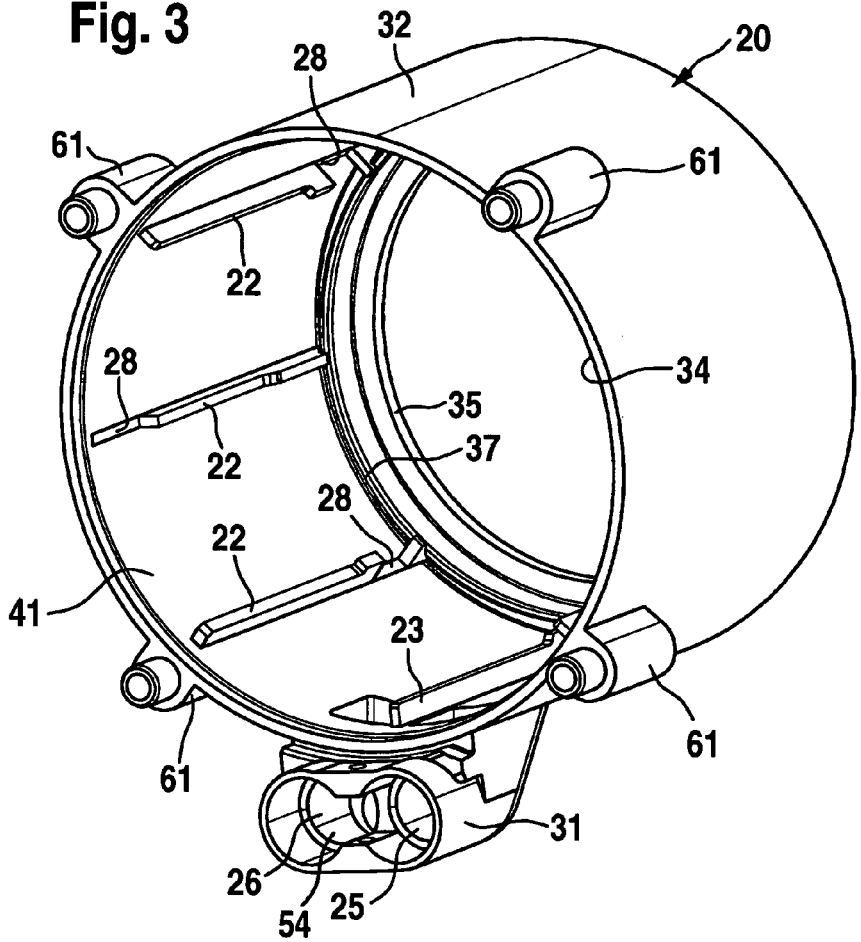
FIG. 3 shows a perspective illustration of a cooling housing of the motor-pump unit from FIG. 1.
Figure 4:
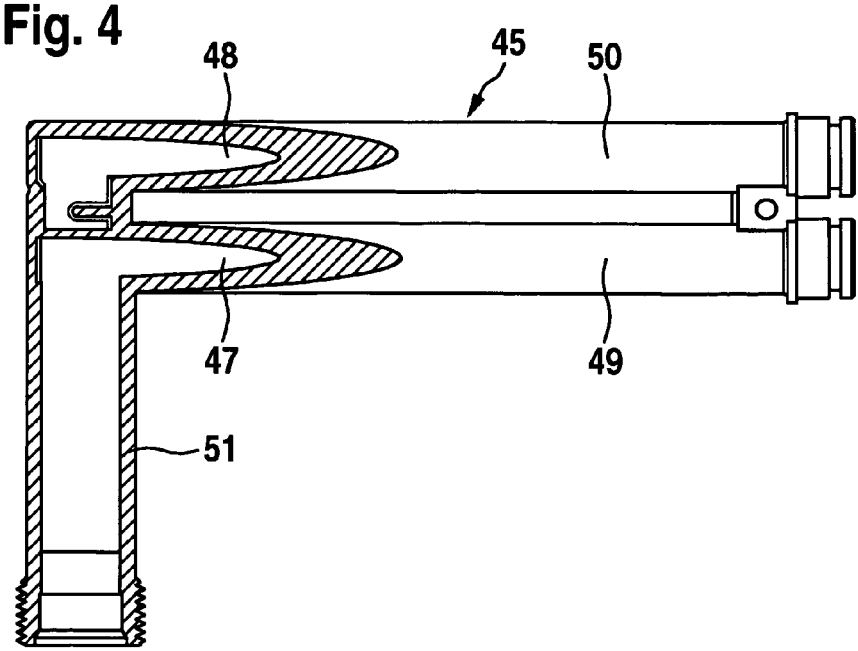
FIG. 4 shows a sectional view along line 4-4 in FIG. 2.
Figure 5:
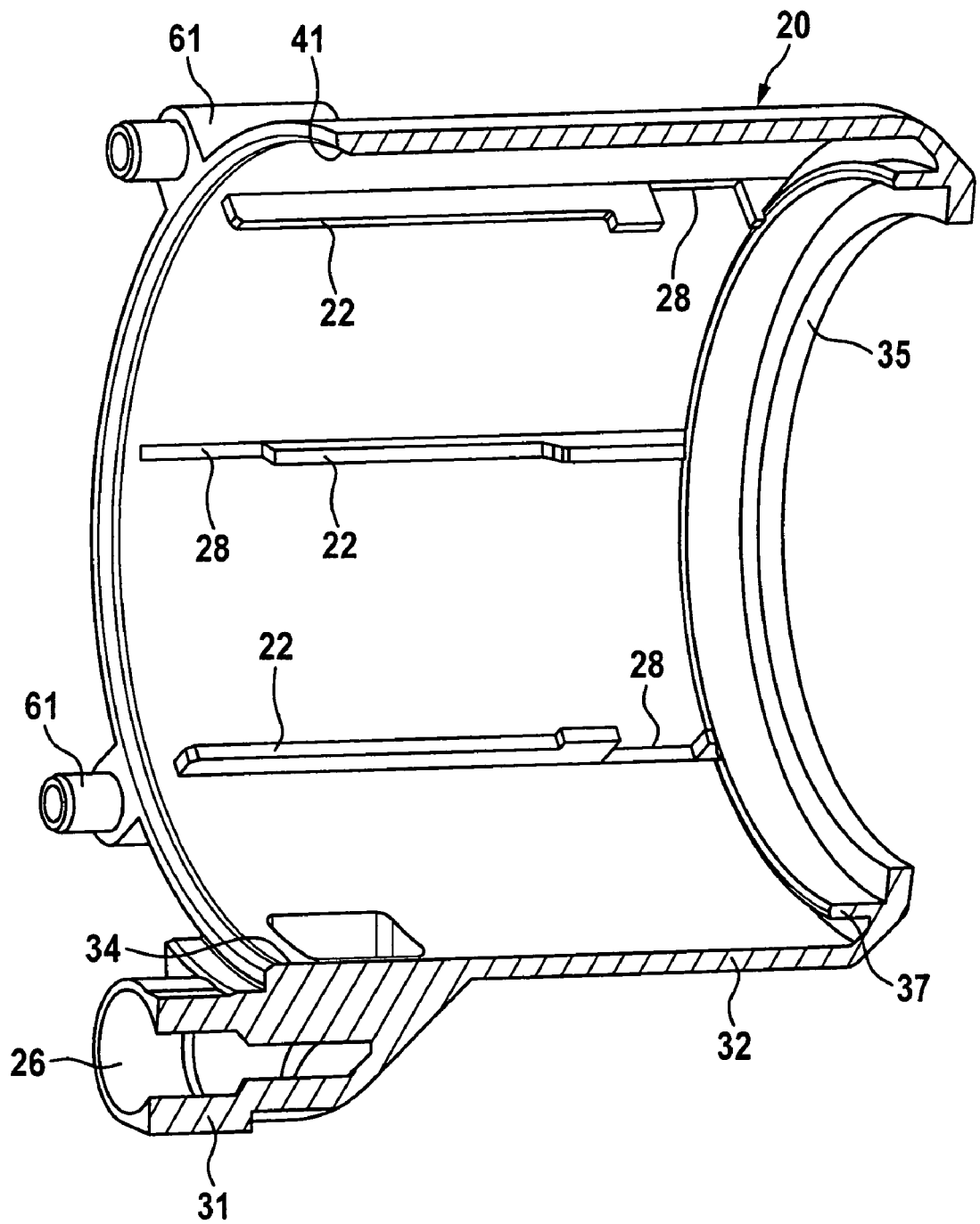
FIG. 5 shows a perspective sectional illustration of the cooling housing from FIG. 3.

FIGS. 1 and 2 illustrate, schematically, a motor-pump unit 10 according to the invention which is used in particular in high-pressure cleaning appliances. It comprises a pump 11, which may be in the form of a displacement pump. In the exemplary embodiment illustrated, it is in the form of a piston pump. The pump 11 is driven by an electric motor 12, the embodiment illustrated using an asynchronous motor.

The pump 11 has a suction inlet 14 via which liquid, preferably water, can be fed to a pumping chamber which is known per se. In the pumping chamber, the liquid is subjected to pressure, and the pressurized liquid is discharged via a pressure outlet 15. The pressure outlet 15 may have connected to it, for example, a high-pressure hose, which carries a spray nozzle or a spray lance at its free end.

The electric motor 12 has a cup-like motor housing 17 which is enclosed in the circumferential direction by a cooling housing 20, the motor housing 17 and cooling housing 20 defining between them a cavity which encloses the motor housing 17 in the circumferential direction.

On its inside, the cooling housing 20 has a plurality of uniformly spaced-apart supporting ribs 22 which each run in the axial direction, that is to say in the longitudinal direction of the motor-pump unit 10, engage against the outside of the motor housing 17 and, in the manner of a spacer, ensure preservation of the cavity between the motor housing 17 and the cooling housing 20. With the exception of one supporting rib 23, which is disposed between a cooling-housing inflow 25 and a cooling-housing outflow 26, the supporting ribs 22 each have a through-passage 28 via which liquid which is fed to the cavity via the cooling-housing inflow 25 can flow through. The through-passages 28 of adjacent supporting ribs 22 are offset axially in relation to one another, so that the supporting ribs 22 overall define a labyrinthine flow path which leads around the motor housing 17 in the circumferential direction from the cooling-housing inflow 25 to the cooling-housing outflow 26.

The cooling-housing inflow 25 and the cooling-housing outflow 26 are disposed one beside the other on a connection part 31 of the cooling housing 20, this connection part projecting externally from a casing part 32 of the cooling housing 20. The casing part 32 is configured in the manner of a tube portion or a cylindrical sleeve and encloses the motor housing 17. It defines a front opening 34, which is directed toward the pump 11, and a rear opening 35, which is directed away from the pump 11. Adjacent to the rear opening 35, the casing part 32 has a sealing lip 37 which can be positioned in a sealing manner against the motor housing 17 and seals the cavity between the motor housing 17 and the cooling housing 20 in the region of the rear opening 35.

Level with the front opening 34, the motor housing 17 has a radially outwardly projecting annular flange 39 onto which the casing part 32 can be pushed by way of a front end region 41 in order to seal the cavity between the motor housing 17 and the cooling housing 20 level with the front opening 34.

The liquid fed to the suction inlet 14 can be guided beforehand through the cavity between the motor housing 17 and the cooling housing 20. For this purpose, use is made, according to the invention, of a connecting device 45 which is in the form of a rigid line system and is disposed laterally alongside the pump 11. It comprises a first flow channel 47 and a second flow channel 48, each in the form of a respective tube portion 49, 50. The first tube portion 49 starts from a rigid feed line 51, from which it branches at right angles. The feed line 51 forms, at its free end, a first connection 52, and the free end of the first tube portion 49 may be connected to the cooling-housing inflow 25. For this purpose, the connection part 31 forms a connection bushing 54, into which the free ends of the two tube portions 49 and 50 can be inserted. Liquid can be fed to the cooling-housing inflow 25 via the first connection 52, the feed line 51 and the first tube portion 49, so that it can then flow through the cavity between the motor housing 17 and the cooling housing 20. Starting from the cooling-housing outflow 26, the liquid can then be fed to a second connection 56 of the connecting device 45 via the second tube portion 50. The second connection 56 can be connected to the suction inlet 14, so that the liquid, after having flowed through the cavity between the motor housing 17 and the cooling housing 20, can be subjected to pressure, and discharged via the pressure outlet 15, by the pump 11.

The connecting device 45 is configured as a structural unit which can be connected in a releasable manner to the suction inlet 14 and the cooling-housing inflow 25 and the cooling-housing outflow 26 and is produced from plastics material. It is used if the electric motor 12 is operated at a high electrical output level, and consequently generates high levels of waste heat and should thus be cooled by liquid. If the electric motor 12 is operated at a comparatively low output level, the connecting device 45 may be dispensed with. In this case, liquid which is to be subjected to pressure can be guided to the suction inlet 14 via a suction connector, which is known per se and has therefore not been illustrated in the drawing, without the liquid flowing beforehand through the cavity between the motor housing 17 and the cooling housing 20.

The cooling housing 20 is configured as a single-piece plastics molding and, during assembly of the motor-pump unit 10, can be pushed axially onto the motor housing 17. For the releasable connection between the cooling housing 20 and a retaining flange 59 which projects radially outward from a pump housing 58, use can be made of connecting screws with a self-tapping thread, so that the connecting screws can be screwed directly into screw bosses 61 of the cooling housing 20, these bosses being integrally formed on the outside of the casing part 32. It is thus possible to dispense with additional lock nuts. This constitutes an additional way of facilitating the assembly of the motor-pump unit 10.

The invention claimed is:

1. A motor-pump unit for a high-pressure cleaning appliance, comprising:
   an electric motor,
   a pump, the pump having a suction inlet for taking in a liquid and a pressure outlet for discharging a pressurized liquid,
   the electric motor comprising a motor housing which is enclosed by a cooling housing,
   a cavity formed between the motor housing and the cooling housing, wherein a cooling liquid is fed to the cavity via a cooling-housing inflow and conducted away from the cavity via a cooling-housing outflow, and the cooling-housing outflow being in flow connection with the suction inlet, and
   a connecting device disposed laterally alongside the pump, external to the cooling housing, and having:
      a first connection, which is connected in a releasable manner to the cooling-housing inflow via a first flow channel, and
      a second connection, which is connected in a releasable manner to the cooling-housing outflow via a second flow channel and is connected to the suction inlet.

2. The motor-pump unit according to claim 1, wherein the connecting device is configured as a structural unit which is adapted to be connected in a releasable manner to the suction inlet, the cooling-housing inflow and the cooling-housing outflow.

3. The motor-pump unit according to claim 1, wherein the connecting device is configured as a rigid conduit system.

4. The motor-pump unit according to claim 1, wherein the connecting device is produced from a plastic material.

5. The motor-pump unit according to claim 1, wherein the first and second flow channels are disposed parallel to one another.

6. The motor-pump unit according to claim 1, wherein the first and second flow channels are configured as rigid tubing lines.

7. The motor-pump unit according to claim 1, further comprising a pump housing, wherein the cooling housing is adapted to be connected in a releasable manner to the pump housing.

8. The motor-pump unit according to claim 1, wherein the cooling housing is produced from a plastic material.

9. The motor-pump unit according to claim 1, wherein the cooling-housing inflow and the cooling-housing outflow are disposed one beside the other.

10. The motor-pump unit according to claim 1, wherein the cooling housing comprises a casing part, which encloses the motor housing, and a connection part, which projects outward from the casing part, the cooling-housing inflow and the cooling-housing outflow being disposed on the connection part.

11. The motor-pump unit according to claim 10, wherein the connection part projects beyond the casing part in a direction of the pump.

12. The motor-pump unit according to claim 10, wherein the casing part is connected integrally to the connection part.

13. The motor-pump unit according to claim 1, wherein:
the cooling housing has a casing part which encloses the motor housing in a circumferential direction, and
the cooling housing comprises, on an inside, a plurality of spaced-apart supporting ribs which engage against the motor housing.

14. The motor-pump unit according to claim 13, wherein in the cavity, one of the plurality of supporting ribs is disposed between the cooling-housing inflow and the cooling-housing outflow.

15. The motor-pump unit according to claim 13, wherein the supporting ribs define a labyrinthine flow path which leads around the motor housing in the circumferential direction from the cooling-housing inflow to the cooling-housing outflow.

16. The motor-pump unit according to claim 1, wherein the cooling housing has a casing part which is configured as a cylindrical sleeve and is adapted to be pushed axially onto the motor housing.

17. The motor-pump unit according to claim 1, wherein the cooling housing has a sealing lip which is adapted to be positioned in a liquid-tight manner against the motor housing.

18. The motor-pump unit according to claim 1, wherein the motor housing has an outwardly projecting annular flange and the cooling housing is adapted to be pushed onto the annular flange in a liquid-tight manner.

* * * * *